(12) United States Patent
Bauchot et al.

(10) Patent No.: US 8,655,788 B2
(45) Date of Patent: *Feb. 18, 2014

(54) AUTHENTICATION OF AN END USER

(75) Inventors: Frederic Bauchot, Saint-Jeannet (FR);
Flemming Boegelund, Frederikssund (DK); Gerard Marmigere, Drap (FR); Sebastian Thomschke, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/494,077

(22) Filed: Jun. 12, 2012

(65) Prior Publication Data
US 2012/0254990 A1 Oct. 4, 2012

Related U.S. Application Data

(63) Continuation of application No. 12/316,221, filed on Dec. 10, 2008, now Pat. No. 8,260,718.

(30) Foreign Application Priority Data

Nov. 28, 2008 (EP) .................................... 08305867

(51) Int. Cl.
*G06Q 20/00* (2012.01)
(52) U.S. Cl.
USPC ................................. 705/64; 705/67; 726/28
(58) Field of Classification Search
USPC .......................................................... 705/64
See application file for complete search history.

(56) References Cited

U.S. PATENT DOCUMENTS

| 4,016,404 A | 4/1977 | Appleton |
| 4,670,644 A | 6/1987 | Grayson |
| 5,056,142 A | 10/1991 | Lapointe et al. |

(Continued)

FOREIGN PATENT DOCUMENTS

| JP | 10307799 | 11/1998 |
| JP | 2000172644 | 6/2000 |
| JP | 2003256373 | 9/2003 |
| WO | 2007068098 | 6/2007 |

OTHER PUBLICATIONS

Ito et al., "Authentication with 3D Pattern Communication," Electronics and Communications in Japan, Part 1, vol. 87, No. 12, 2004. Obtained from Wiley Periodicals, Inc., pp. 78-89.

(Continued)

*Primary Examiner* — Jacob C. Coppola
(74) *Attorney, Agent, or Firm* — Schmeiser, Olsen & Watts, LLP; John Pivnichny

(57) ABSTRACT

A method for authenticating an end user. The method begins by generating a login field in response to receiving an authentication request from an end user. The login field comprises a plurality of colored nodes containing a first subset of nodes matching both color and location to a second subset of nodes residing in a transparent credit card being controlled by the end user. Next the method determines the authenticity status of the end user by comparing data received from the end user with the first subset of nodes. The end user having generated the data by overlaying the transparent credit card on top of the login field and selecting at least one colored node. Each node being selected according to a function utilizing both static and dynamic variables. Finally, the method sends the determined authenticity status to the end user via an output device.

9 Claims, 4 Drawing Sheets
(2 of 4 Drawing Sheet(s) Filed in Color)

(56) References Cited

U.S. PATENT DOCUMENTS

| | | | |
|---|---|---|---|
| 5,251,259 | A | 10/1993 | Mosley |
| 5,450,491 | A | 9/1995 | McNair |
| 5,488,664 | A | 1/1996 | Shamir |
| 5,742,035 | A | 4/1998 | Kohut |
| 5,939,699 | A | 8/1999 | Perttunen |
| 7,007,168 | B2 | 2/2006 | Kubo et al. |
| 7,181,433 | B2 | 2/2007 | Yousofi |
| 7,263,205 | B2 | 8/2007 | Lev |
| 7,266,693 | B1 | 9/2007 | Potter et al. |
| 7,659,869 | B1 | 2/2010 | Bauchot et al. |
| 7,672,906 | B2 | 3/2010 | Schwartz et al. |
| 7,845,013 | B2 | 11/2010 | Bhogal et al. |
| 8,150,034 | B2 | 4/2012 | Hogl |
| 8,201,227 | B2 | 6/2012 | Bauchot et al. |
| 8,260,717 | B2 | 9/2012 | Bauchot et al. |
| 8,260,718 | B2 | 9/2012 | Bauchot et al. |
| 8,355,993 | B2 | 1/2013 | Bauchot et al. |
| 2001/0026248 | A1 | 10/2001 | Goren et al. |
| 2005/0140497 | A1 | 6/2005 | Chiviendacz et al. |
| 2005/0144449 | A1 | 6/2005 | Voice |
| 2005/0144450 | A1 | 6/2005 | Voice |
| 2005/0149761 | A1 | 7/2005 | Chiviendacz et al. |
| 2006/0015725 | A1 | 1/2006 | Voice et al. |
| 2006/0020559 | A1 | 1/2006 | Steinmetz |
| 2006/0031174 | A1 | 2/2006 | Steinmetz |
| 2006/0156385 | A1 | 7/2006 | Chiviendacz et al. |
| 2007/0005967 | A1 | 1/2007 | Mister et al. |
| 2007/0098965 | A1 | 5/2007 | Hoshiyama |
| 2007/0277224 | A1 | 11/2007 | Osborn et al. |
| 2007/0282854 | A1* | 12/2007 | Bhogal et al. ............ 707/10 |
| 2007/0289000 | A1 | 12/2007 | Weiss |
| 2008/0005035 | A1 | 1/2008 | Schwartz et al. |
| 2008/0148352 | A1 | 6/2008 | Matsumoto et al. |
| 2009/0067627 | A1 | 3/2009 | Hogl |
| 2009/0282464 | A1 | 11/2009 | Bauchot et al. |
| 2010/0024004 | A1 | 1/2010 | Boegelund et al. |
| 2010/0138657 | A1 | 6/2010 | Bauchot et al. |
| 2010/0138912 | A1 | 6/2010 | Bauchot et al. |
| 2012/0204229 | A1 | 8/2012 | Bauchot et al. |
| 2012/0204230 | A1 | 8/2012 | Bauchot et al. |
| 2012/0210411 | A1 | 8/2012 | Bauchot et al. |

OTHER PUBLICATIONS

QRick Card System, [online] 1 page. [retrieved on May 28, 2008]. Retrieved from the Internet:< URL :http://ubiks.net/local/blog/jmt/archives3/004419.html>.

Help in Connecting to Jyske Netbank. [online] 2 pages—original and English Translation. [retrieved on Sep. 11, 2008]. Retrieved from the Internet:< URL :https://www.jyskedistance.dk/service/_jb/ASP/Apps/NetbankDemo/demo/jb/html/DK/hlplogon1.htm>.

RSA SecurID. [online] 3 pages. [retrieved on Aug. 21, 2008]. Retrieved from the Internet:< URL: http://www.rsa.com/node.aspx?id=1156>.

Zhao, et al.; Anti-Phishing Mutual Authentication Using Visual Secret Sharing Scheme, Oct. 17-20, 2010, Information Theory and its Applications (ISITA), 2010 International Symposium, pp. 560-565.

SecurID, Wikipedia, Nov. 27, 2007. [online]. 2 pages. [retrieved on Dec. 1, 2007]. Retrieved from the Internet: < URL: http://en.wikipedia.org/wiki/SecurID >.

Office Action (Mail Date Jun. 7, 2011) for U.S. Appl. No. 12/128,060, filed May 28, 2008.

Notice of Allowance (Mail Date Feb. 8, 2012) for U.S. Appl. No. 12/128,060, filed May 28, 2008.

Notice of Allowance (Mail Date Sep. 28, 2009) for U.S. Appl. No. 12/329,972, filed Dec. 8, 2008.

Office Action (Mail Date Oct. 24, 2011) for U.S. Appl. No. 12/316,149, filed Dec. 10, 2008.

Notice of Allowance (Mail Date Feb. 10, 2012) for U.S. Appl. No. 12/316,149, filed Dec. 10, 2008.

Office Action (Mail Date Oct. 20, 2011) for U.S. Appl. No. 12/316,221, filed Dec. 10, 2008.

Office Action (Mail Date Jan. 28, 2011) for U.S. Appl. No. 11/967,910, filed Dec. 31, 2007.

Office Action (Mail Date Jun. 14, 2011) for U.S. Appl. No. 11/967,910, filed Dec. 31, 2007.

Amendment filed Jan. 20, 2012 in response to Office Action (Mail Date Oct. 20, 2011) for U.S. Appl. No. 12/316,221, filed Dec. 10, 2008.

Notice of Allowance (Mail Date Mar. 26, 2012) for U.S. Appl. No. 12/316,221, filed Dec. 10, 2008.

Amendment filed Sep. 6, 2011 in response to Office Action (Mail Date Jun. 7, 2011) for U.S. Appl. No. 12/128,060, filed May 28, 2008.

Final Office Action (Mail Date Nov. 17, 2011) for U.S. Appl. No. 12/128,060, filed May 28, 2008.

Amendment after Final filed Jan. 17, 2012 in response to Final Office Action (Mail Date Nov. 17, 2011) for U.S. Appl. No. 12/128,060, filed May 28, 2008.

Amendment filed Jan. 23, 2012 in response to Office Action (Mail Date Oct. 24, 2011) for U.S. Appl. No. 12/316,149, filed Dec. 10, 2008.

Amendment filed Apr. 20, 2011 in response to Office Action (Mail Date Jan. 28, 2011) for U.S. Appl. No. 11/967,910, filed Dec. 31, 2007.

Request for Continued Examination and Amendment filed Sep. 14, 2011 in response to Office Action (Mail Date Jun. 14, 2011) for U.S. Appl. No. 11/967,910, filed Dec. 31, 2007.

Notice of Allowance (Mail Date Aug. 17, 2012) for U.S. Appl. No. 13/454,250, filed Apr. 24, 2012.

Request for Continued Examined filed Sep. 7, 2012 for U.S. Appl. No. 13/454,198, filed Apr. 24, 2012.

Notice of Allowance (Mail Date Jul. 19, 2012) for U.S. Appl. No. 13/454,198, filed Apr. 24, 2012.

U.S. Appl. No. 13/454,250, filed Apr. 24, 2012.

Verheul et al.; Binding Cryptography. A Fraud-Detectible Alternative to Key-Escrow Proposals; The Computer Law & Security Report, Jan.-Feb. 1997; 17 pages.

U.S. Appl. No. 13/451,952, filed Apr. 20, 2012.

U.S. Appl. No. 13/454,198, filed Apr. 24, 2012.

Verheul et al., Binding cryptography. A fraud-detectible alternative to key-escrow proposals, The computer Law & Security Report, Jan.-Feb. 1997, pp. 3-14, [retrieved on Jul. 13, 2012] Retrieved from the Internet: <http://rechten.uvt.nl/koops/bind-art.htm>.

U.S. Appl. No. 13/900,620, filed May 23, 2013.

* cited by examiner

AUTHENTICATION OF AN END USER

This application is a continuation application claiming priority to Ser. No. 12/316,221, filed Dec. 10, 2008.

BACKGROUND OF THE INVENTION

The present invention relates to authenticating an end user; more specifically, authenticating an end user by means of dynamic information to prevent fraud.

Conventional authentication methods utilize static information to validate an end user. Since static information by its very nature rarely changes, individuals can easily capture an end user's authentication information for fraudulent use in the future.

Furthermore, conventional authentication methods traditionally employ only 1-way authentication. The term 1-way authentication hereinafter means identifying only a single party to a multiple party transaction. Conventional authentication methods usually call for an end user to authenticate to an entity (e.g. bank, credit card company, government agency, etc.) without the entity authenticating to the end user. The use of 1-way authentication methods exposes an end user to phishing attacks. The term phishing hereinafter means an attempt to criminally and/or fraudulently acquire sensitive information by masquerading as a trustworthy entity in an electronic medium.

SUMMARY OF THE INVENTION

The present invention provides a method for authenticating an end user, said method comprising:

generating a login field in response to receiving an authentication request from said end user, said login field comprising a plurality of colored nodes, said plurality of colored nodes containing a first subset of nodes matching both color and location to a second subset of nodes residing in a transparent credit card being controlled by said end user;

determining an authenticity status of said end user by comparing a third subset of nodes received from said end user with said first subset of nodes, said third subset of nodes being received in response to sending said login field to said end user, said end user having generated said third subset of nodes by overlaying said transparent credit card on top of said login field and selecting at least one node which displays a color not being black, each node of said at least one node being selected according to a function utilizing both static and dynamic variables; and sending said determined authenticity status to said end user via an output device.

BRIEF DESCRIPTION OF THE DRAWINGS

The patent application or application file contains at least one drawing executed in color. Copies of this patent or patent application publication with color drawing(s) will be provided by the Office upon request and payment of the necessary fee.

The patent application file contains at least one drawing executed in color.

DETAILED DESCRIPTION OF THE DRAWINGS

Definitions

The term 'credit card' as used herein refers to any automated teller machine (ATM) card, credit card, charge card, debit card, gift card, etc. issued by an entity which allows an end user the ability to purchase goods and/or services therewith.

The term 'node' as used herein refers to a single point residing within either a login field and/or a transparent credit card.

Specification

Although certain embodiments of the present invention are described herein, it is understood that modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1:
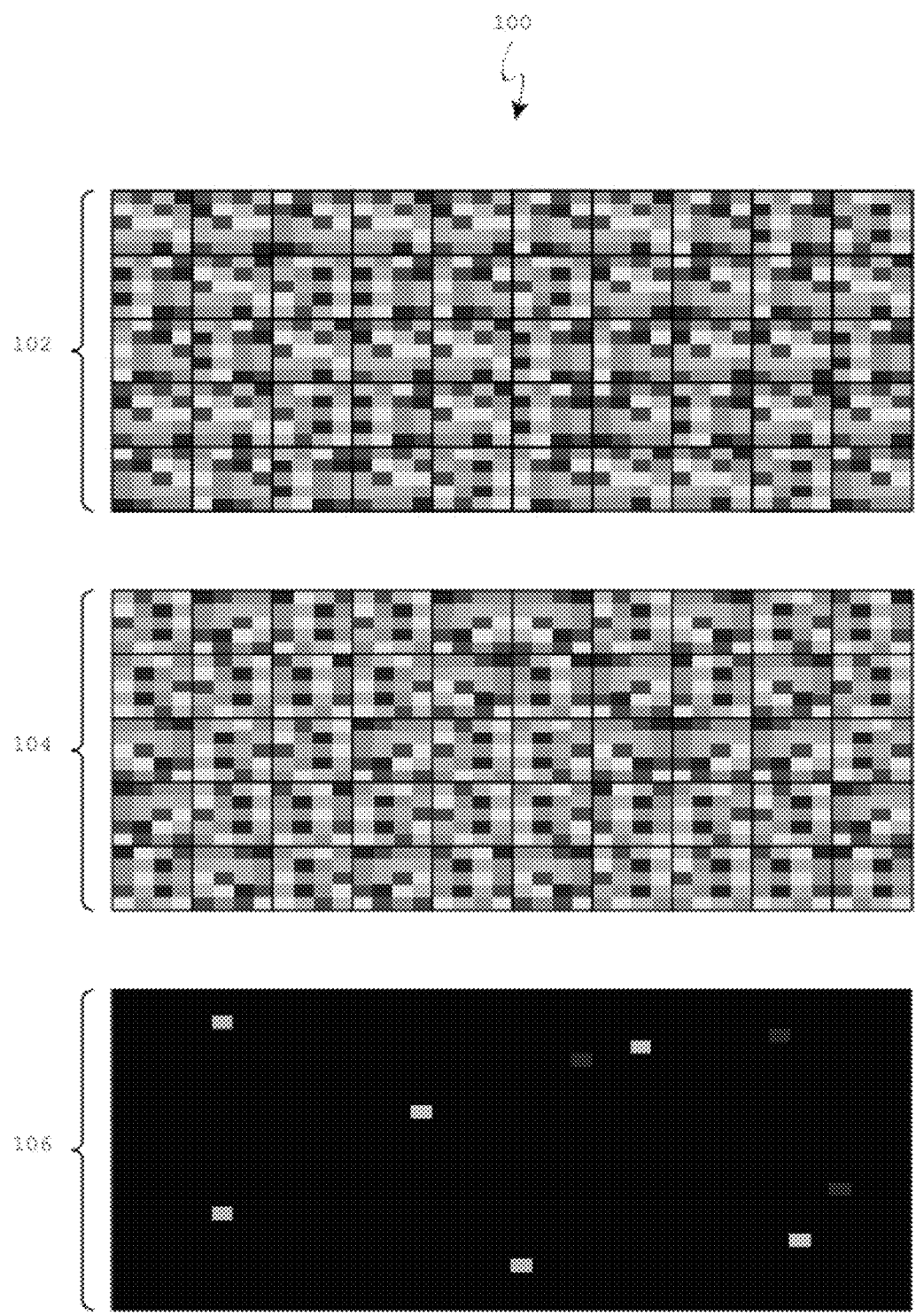
FIG. 1 illustrates a graphical representation of the combination of transparent credit card and login field, in accordance with embodiments of the present invention.

FIG. 1 illustrates a graphical representation 100 of the combination 106 of transparent credit card 102 and login field 104, in accordance with embodiments of the present invention.

A transparent credit card 102 is assigned to an end user prior to an authentication attempt. The transparent credit card 102 comprises a plurality of nodes, each displaying a seemingly random color. Only the provider of said transparent credit card 102 knows the pattern of colors contained in the transparent credit card 102.

The login field 104 also comprises a plurality of nodes, each displaying a seemingly random color. The color pattern of nodes contained within the login field 104 is dynamically created each time the end user whishes to authenticate, therefore each authentication attempt will produce a different color pattern of nodes in the login field 104.

Contained within each pattern produced in the login field 104 is a first subset of nodes. Each node in the first subset of nodes matches both the color and location of a unique node residing in the transparent credit card 102. The nodes residing in the transparent credit card matching the color and location as the first subset of nodes are called the second subset of nodes.

Overlaying the transparent credit card 102 on top of the login field 104 results in the combination 106. The combination 106 displays the nodes in both the transparent credit card 102 and the login field 104 having the same color and having the same location (i.e. the first and second subset of nodes).

In one embodiment of the present invention, the login field 104 will display colors such that when the transparent credit card 102 is overlaid, if the overlaid nodes do not match in color they will therein produce a dark, i.e. black, color. The blackening of non-color matching nodes will help identify for the end user which nodes are to be selected from to effectuate the authentication attempt.

Figure 2:
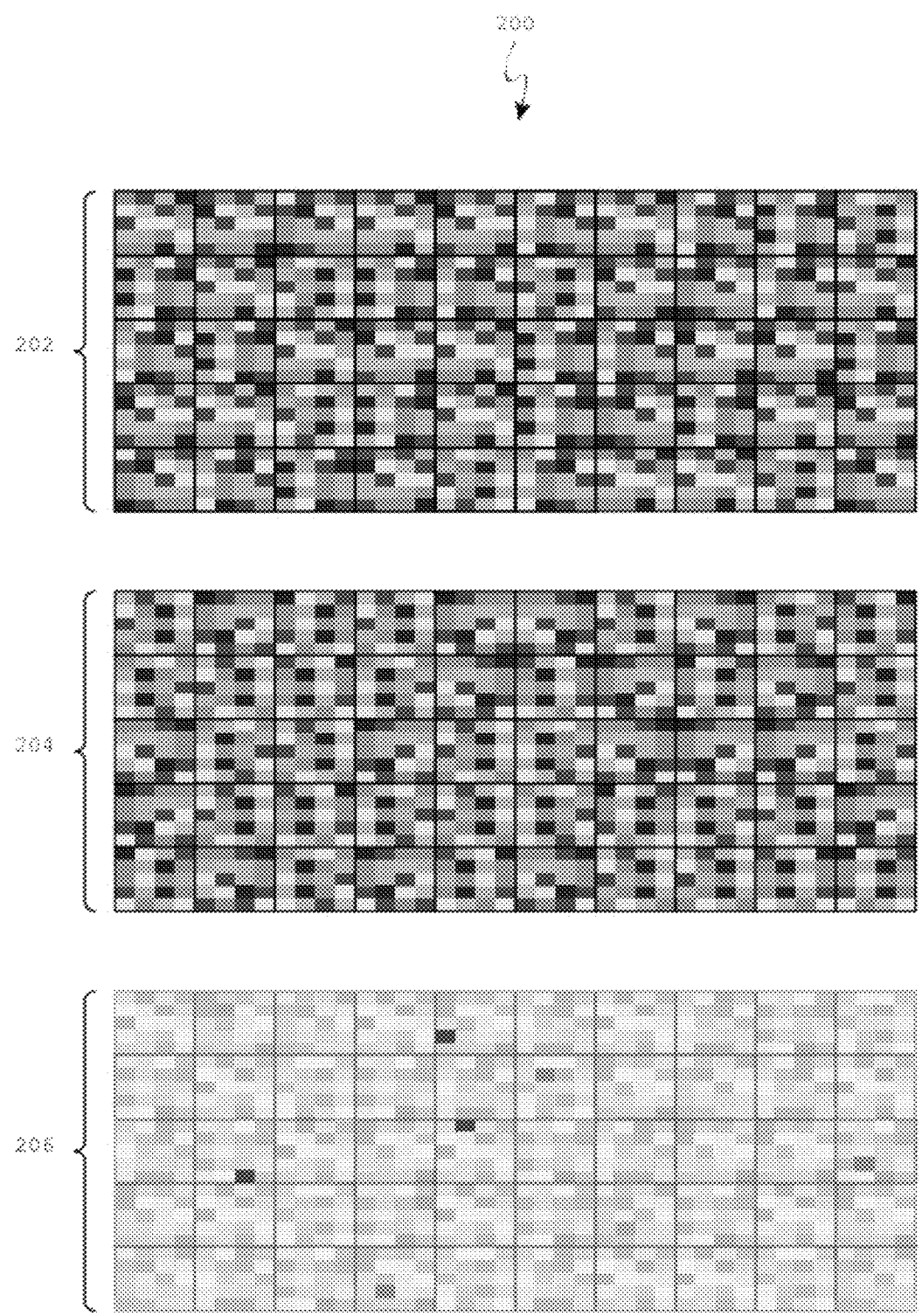
FIG. 2 illustrates a graphical representation of an alternative combination of transparent credit card and login field, in accordance with embodiments of the present invention.

In another embodiment of the present invention, the transparent credit card 102 when overlaid on top of the login field 104 merely turns non-color matching nodes a neutral color so as to highlight the matching colored nodes more easily (see 202 in FIG. 2, infra).

The combination 106 comprises at least three different groups of differently colored nodes. At this point the end user would select the group of colored nodes which match the result of a function. The function comprises both static and dynamic information gathered by the end user and thus prevents unauthorized individuals the ability to decipher the login scheme.

If the end user properly selects the appropriately colored nodes displayed in the combination 106, then the end user would properly authenticate and gain access to secure information. However, if the end user selects the wrong color nodes, the end user is denied access to the secure information.

FIG. 2 illustrates a graphical representation 200 of an alternative combination 206 of transparent credit card 202 and login field 204, in accordance with embodiments of the present invention.

Overlaying the transparent credit card 202 on top of the login field 204 results in the alternative combination 206. The combination 206 displays the nodes in both the transparent credit card 202 and the login field 204 having the same color and having the same location (i.e. the first and second subset of nodes).

Specifically, the transparent credit card 202 when overlaid on top of the login field 204 turns non-color matching nodes a neutral and/or lightened color so as to highlight the matching colored nodes more easily.

The alternative combination 206 comprises at least three different groups of differently colored nodes. At this point the end user would select the group of colored nodes which match the result of a function. The function comprises both static and dynamic information gathered by the end user and thus prevents unauthorized individuals the ability to decipher the login scheme.

If the end user properly selects the appropriately colored nodes displayed in the combination 206, then the end user would properly authenticate and gain access to secure information. However, if the end user selects the wrong color nodes, the end user is denied access to the secure information.

Figure 3:
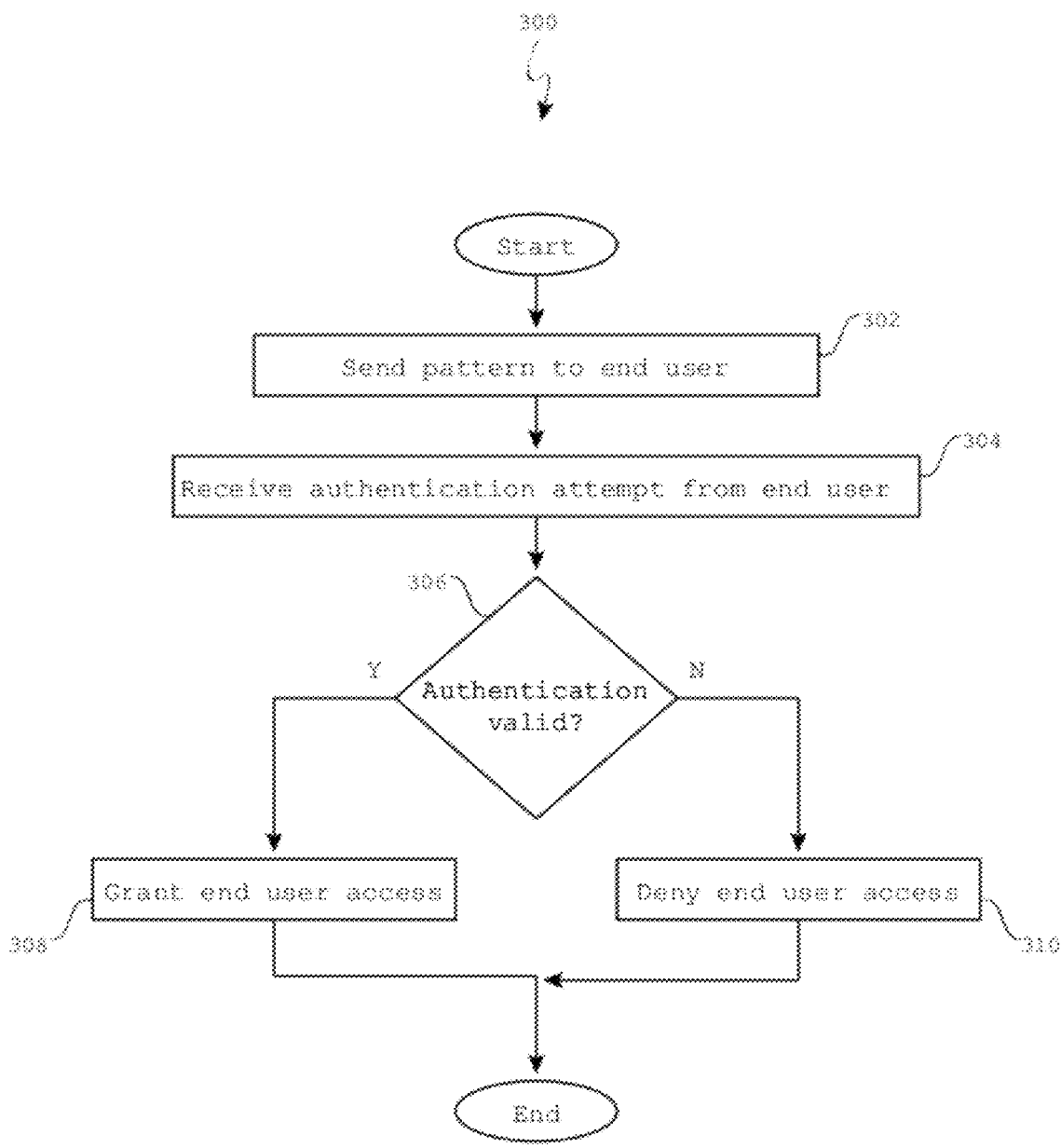
FIG. 3 illustrates a method for authenticating an end user, in accordance with embodiments of the present invention.

FIG. 3 illustrates a method 300 for authenticating an end user, in accordance with embodiments of the present invention.

The method 300 begins with step 302 which comprises sending a login field to the end user. The login field is sent to the end user in response to the end user requesting access to the secure information. Contained within the login field is a first subset of nodes which match both the color and location of a second subset of nodes, the second subset of nodes residing in the end user's transparent credit card. The first subset of nodes is dynamically selected each time the end user wishes to authenticate thus no two instances of the first subset are the same.

In one embodiment of the present invention, the end user requests the authentication attempt by submitting a unique userID. The userID is therein used to identify the color pattern residing in the transparent credit card assigned to the end user. The pattern residing in the transparent credit card is used to select the nodes which comprise the first subset of nodes located in the login field.

After completion of step 302, the method 300 continues with step 304 which comprises receiving authentication data from the end user. Step 304 receives data comprising the locations for a set of nodes which the end user selected after overlaying their transparent credit card on top of the login field and completing a function.

In one embodiment of the present invention, the function comprises both dynamic and static variables, the static variable known only to the end user and the provider of the transparent credit card. Along with the dynamic and static variables, the provider of the transparent credit card must assign numeric values to each color present in both the transparent credit card and login field.

For example, the transparent credit card provider assigns the following colors numeric values: red=0; green=1; blue=2; yellow=3, white=4, etc. The end user must be aware of each color's numeric value before attempting to authenticate. Additionally, the static variable S represents month in which the end user was born. The dynamic variable D represents the day which the end user attempts to authenticate. Finally, a second dynamic variable C represents the number of colors present when the end user overlays the transparent credit card on top of the login field.

When the end user overlays their transparent credit card on top of the login field, the combination produces three color combination: red, green, and blue (see 206 in FIG. 2, supra). If the end user was born on Sep. 1, 1948, and attempts to authenticate on March $3^{rd}$, the function appears as follows:

$$\text{Color Value}=(S+D)\text{modulo}C=(3+9)\text{modulo}3=0$$

Use of the modulo operation ensures that the color value calculated by use of the function matches one of the assigned color values present in the combination. Since the numeric value of zero (0) was assigned to the color red, the end user would select all the red nodes which appear in response to overlaying the transparent credit card on top of the login field.

After completion of step 304, the method 300 continues with step 306 which comprises determining whether the end user's authentication attempt is valid or invalid. Step 306 compares the nodes selected in the authentication data received pursuant to step 304 with the first subset of nodes residing in the login field.

If the authentication data received from the end user contains each and every node which both: 1) correspond to a node from the first subset of nodes residing the login field; and 2) correspond to the color value determined by use of the function identified supra, then step 306 returns a response 'yes' and the method 300 continues with step 308 which comprises granting the end user access to the secure information.

In one embodiment of the present invention, step 306 returns a response 'no' and the method 300 denies the end user access 310 if the authentication data received pursuant to step 304 contains at least one node having a color which does not correspond to the color value determined by use of the function identified supra. For example, if the authentication data contains three red node locations and one green node location where the color value calculated pursuant to the function corresponds to red, the end user's authentication attempt fails.

In an alternative embodiment of the present invention, step 306 returns a response 'no' and the method 300 denies the end user access 310 if the authentication data received pursuant to step 304 contains at least one node not corresponding to any node in the first subset of nodes residing in the login field.

In another alternative embodiment of the present invention, step 306 returns a response 'no' and the method 300 denies the end user access 310 if the authentication data received pursuant to step 304 does not contain all nodes which: 1) correspond to nodes in the first subset of nodes residing in the login field; and 2) correspond to the color value determined by use of the function identified supra. For example, if the authentication data contains only two red node locations where the first subset of nodes in the login field comprises three red nodes and the color value determined by use of the function corresponds to red, the end user's authentication attempt fails.

Step 308 comprises granting the end user access to secure information. After completion of step 308, the method 300 ends.

Step 310 comprises denying the end user who attempted to authenticate access to the secure information. In one embodiment of the present invention, after completion of step 310, the method 300 ends. In an alternative embodiment of the present invention, after completion of step 310, the method 300 returns to step 302 and sends a new login field to the end user to attempt an authentication again. The new login field would comprise a new and dynamically created first subset of nodes matching a new second subset of nodes residing in the end user's transparent credit card.

Figure 4:
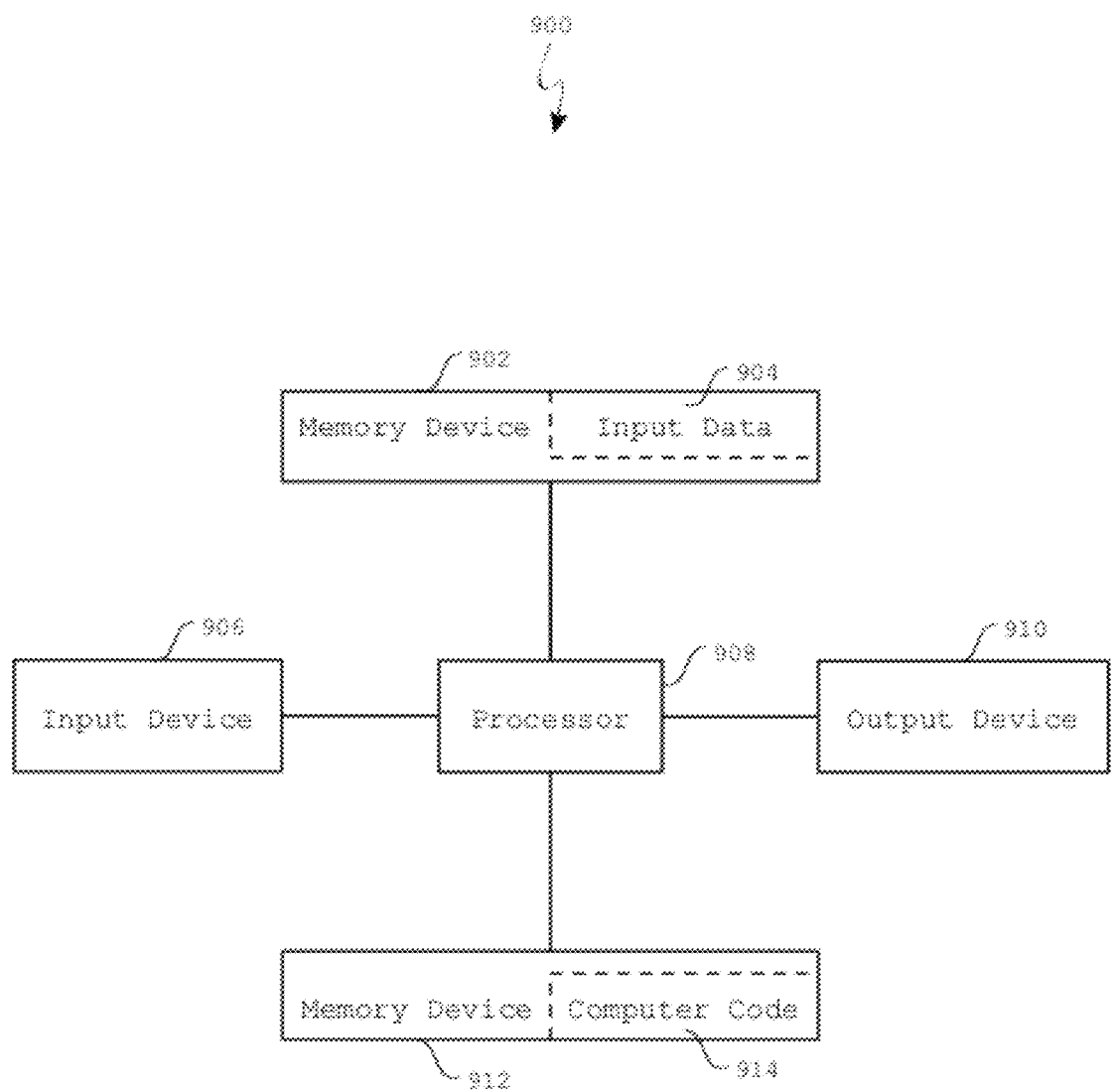
FIG. 4 illustrates a computer system which may facilitate a method for authenticating and end user, in accordance with embodiments of the present invention.

FIG. 4 illustrates a computer system 900 which may facilitate a method for authenticating and end user, in accordance with embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for authenticating and end user according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 4) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for authenticating and end user. Thus, the present invention discloses a process for supporting computer infrastructure, comprising integrating, hosting, maintaining and deploying computer-readable code into a computing system (e.g., computing system 900), wherein the code in combination with the computing system is capable of performing a method for authenticating and end user.

In another embodiment, the invention provides a business method that performs the process steps of the invention on a subscription, advertising and/or fee basis. That is, a service provider, such as a Solution Integrator, can offer to create, maintain, support, etc. a process for authenticating an end user. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 900 as a particular configuration of hardware and software, any configuration of hardware and software, as would be known to a person of ordinary skill in the art, may be utilized for the purposes stated supra in conjunction with the particular computer system 900 of FIG. 4. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed:

1. A method for authenticating an end user, said method comprising:

in response to receiving an authentication request from the end user, a processor of a computer system generating a login field comprising a first plurality of colored nodes, each node of the first plurality of colored nodes having a color such that a first multiplicity of colors is distributed in a first random color pattern throughout the first plurality of colored nodes of the login field, each node of a second plurality of colored nodes in a transparent credit card being controlled by the end user having a color such that a second multiplicity of colors is distributed in a second random color pattern throughout the second plurality of colored nodes of the credit card;

said processor sending the login field to the end user;

after said sending the login field to the end user, said processor receiving a set of nodes from the end user;

said processor determining whether the end user is authentic by determining whether required conditions are satisfied, wherein the required conditions are that each node of the set of nodes received from the end user (i) corresponds to a unique node of a first subset of nodes of the first plurality of colored nodes of the login field and (ii) has a same color determined by a function, wherein the first and second plurality of colored nodes are configured such that if the transparent credit card were overlaid by the end user on top of the login field then a second subset of nodes of the plurality of nodes of the credit card would match in color and location the first subset of nodes of the first plurality of nodes of the login field, and wherein the set of nodes received from the end user consists of a third subset of nodes of the second subset of nodes of the second plurality of colored nodes of the credit card, wherein the function is a function of S and D, wherein S is a static integer greater than −1 and known only to both the end user and the provider of the transparent credit card, and wherein D is a dynamic integer known only to both the end user and the provider of the transparent credit card; and in response to said determining whether said end user is authentic, said processor sending to the end user via an output device a communication of whether the end user is authentic.

2. The method of claim 1, said result comprising:
said processor determining that said end user is authentic by determining that the required conditions are satisfied; and
said processor approving said authentication request from said end user in response to said determining that said end user is authentic.

3. The method of claim 1, said result comprising:
said processor determining that said end user is not authentic by determining that the required conditions are not satisfied; and
said processor denying said authentication request from said end user in response to said determining that said end user is not authentic.

4. The method of claim 1, wherein if the transparent credit card were overlaid by the end user on top of the login field, then each node of the second plurality of nodes not in the second subset of nodes is displayed in a resulting color of black.

5. The method of claim 1, wherein the function is dependent upon a dynamic integer (C) representing a total number of colors displayed not being black.

6. The method of claim 1, wherein if the transparent credit card were overlaid by the end user on top of the login field then each color not being black and displayed corresponds to a unique integer known only to both the end user and a provider of the transparent credit card.

7. The method of claim 1,
wherein the function is Color Value=(S+D) modulo C, and
wherein if the transparent credit card were overlaid by the end user on top of the login field then (i) each color not being black and displayed corresponds to a unique integer known only to both the end user and a provider of the transparent credit card and (ii) C is a dynamic integer representing a total number of colors displayed not being black.

8. The method of claim 1, wherein D is selected from the group consisting of day of the week, month of the year, hour of the day, and age of the end user.

9. The method of claim 1, said method further comprising:
providing at least one support service for at least one of creating, integrating, hosting, maintaining, and deploying computer-readable program code in the computer system, said program code being executed by the processor to implement said generating the login field, said sending the login field to the end user, said receiving the set of nodes, said determining whether the end user is authentic, and said the communication to the end user.

* * * * *